United States Patent [19]
Wagner

[11] Patent Number: 5,411,299
[45] Date of Patent: May 2, 1995

[54] INTERCONNECTING APPARATUS AND METHOD FOR AIR HANDLING SYSTEMS

[75] Inventor: Robert K. Wagner, Debarry, Fla.

[73] Assignee: Environmental Technologies, Largo, Fla.

[21] Appl. No.: 672,923

[22] Filed: Mar. 21, 1991

[51] Int. Cl.⁶ ............................................. F16L 41/00
[52] U.S. Cl. ................................. 285/189; 285/915; 285/424; 285/192
[58] Field of Search ............... 285/158, 189, 424, 910, 285/915, 192, 193

[56] References Cited

U.S. PATENT DOCUMENTS

| | | | |
|---|---|---|---|
| 3,998,480 | 12/1976 | Twedell | 285/424 |
| 4,249,758 | 2/1981 | Harris | 285/158 |
| 4,620,729 | 11/1986 | Kauffman | 285/424 |
| 4,770,447 | 9/1988 | Umehara | 285/189 |
| 4,929,001 | 5/1990 | Phillips, II | 285/158 |
| 4,930,815 | 6/1990 | Tuggler, Jr. | 285/158 |

FOREIGN PATENT DOCUMENTS 199104 8/1958 Austria ..................... 285/192

Primary Examiner—Eric K. Nicholson
Attorney, Agent, or Firm—Allen, Dyer, Doppelt, Franjola & Milbrath

[57] ABSTRACT

A connecting member having an elongated passageway defined by a tubular wall extends from a first end to a second end, with the first end adapted to mate with a main air handling system. The tubular wall is provided with a bead adjacent to, but spaced from the first end, and an independent collar having a central opening dimensioned to correspond to the dimension in the bead is fitted about the outer periphery of the tubular wall in the bead. A gasket having an adhesive outer surface is fixed to the collar and facing toward the main air handling system, with the portion of the tubular member at the bead extending through and protecting the gasket from fire risk and deterioration from an air stream passing through the connecting member.

14 Claims, 2 Drawing Sheets

INTERCONNECTING APPARATUS AND METHOD FOR AIR HANDLING SYSTEMS

BACKGROUND OF THE INVENTION

The present invention is directed to apparatus and methods for interconnecting a main air handling system with a subsystem.

In U.S. Pat. No. 4,249,758, Harris discloses an apparatus and method for interconnecting duct work with a heating system main component, utilizing a connecting member formed of molded fiberglass, plastic or similar material and which connecting member has an enlarged circumferential end face generally perpendicular to the elongated direction of the tube which forms the connecting member. A gasket is attached to the face with an adhesive outer surface, and with a piece of release paper over the adhesive. As described in the Harris patent, the passageway of the tubular connecting member is then matched up with an opening in an air system main component so that the gasket surrounds the opening, which is then pushed into sealing relationship with the main component. In the arrangement taught by Harris, the air passing through the opening in the main component and into the tubular connecting member passes directly across the gasket; that is, the gasket is exposed to the air stream. If the temperature of the heated air is sufficiently high, there is a potential fire risk, since many of the materials used for the gasket are flammable. Further, prolonged passage of heated air across the exposed portion of the gasket can cause deterioration.

U.S. Pat. No. 3,985,158 to Felter discloses a box of a plastic insulating material having flanges which are utilized for attachment to a supporting structure. Netherlands Patent 76,439 discloses a tubular connecting member configuration quite similar to that of the Harris patent, with an annular gasket surrounding and sealing a plurality of individual tubular members.

British Patent 1,193,748 is also quite similar in construction to the arrangement taught by Harris, disclosing a pipe connection having a sealing ring used for joinder in the opening of a connecting air diffusive box.

SUMMARY OF THE INVENTION

The present invention is directed to apparatus and methods for resolving some of the deficiencies of the system disclosed by Harris, as described above.

In accordance with the present invention, apparatus is provided for connecting a main air handling system with a subsystem, and includes a connecting member having an elongated passageway defined by a tubular wall extending from a first end to a second end, with the first end adapted to mate with the main air handling system. An independent collar having a central opening is provided, the central opening being dimensioned to correspond to an outside dimension of the tubular wall of the connecting wall at its first end. Means are included for securing the collar laterally about the tubular wall adjacent the first end, but with a portion of the tubular member extending through the collar to the first end. A gasket having an outer adhesive surface is fixed to an outside surface of the collar which faces toward the first end of the tubular connecting member, with the portion of the tubular member extending through and protecting the gasket from heated air passing through the connecting member from the main air handling system.

The present invention contemplates a number of different means for securing the collar in the lateral position, such that the collar is rotatable within the securing means, but restricted against lateral movement along the tubular connecting member. In one arrangement, the securing means comprises an inwardly-indented bead along the tubular wall of the connecting member, the bead defining an inner diameter of the tubular member at the first end. In another arrangement, the bead is formed by the crimping of the tubular wall adjacent to the first end of the tubular connecting member. In yet another embodiment, the tubular connecting member includes a lateral flange at the first end which extends outwardly to a dimension which is substantially less than the lateral dimension of the collar, with a portion of the gasket sandwiched between the inside surface of the flange and the outside surface of the collar.

It is a preferred feature of the present invention that the collar be sufficiently thin so as to be deformable under pressure of a sheet metal fastener extending through it and against the outside wall of the main handling system, so as to achieve the desired sealed joint between the connecting member and the main air handling system. Further in that regard, the independent collar is not rigidly joined to the periphery of the tubular connecting member, in order to facilitate the flexing of the collar as the gasket is brought into surrounding relationship about the opening in the main air handling system.

The use of a tubular connecting member which extends through the center of the gasket material obtains several benefits. First, the portion of the connecting member extending through the gasket protects the gasket from damage caused by hot air passing through the connecting member. Second, the extension of the tubular member through the collar in the gasket permits the first end of the tubular connecting member to be extended into the interior of the main air handling system, thereby creating a much stronger interconnecting joint than is otherwise achieved with gasket material constituting the sole contact with the main air handling system, especially where that gasket material is deteriorated because of the elevated temperatures of the wall of the main air handling system. Third, when the first end of the tubular connecting member is extended into the interior of the main air handling system, the first end may be shaped to facilitate the flow of air into the connecting member. For example, in one arrangement it is feasible to bevel the first end of the connecting member outwardly in a downstream direction within the interior of the main air handling system, so as to more efficiently direct air into the tubular connecting member.

Further, the use of a collar which is independent of the construction of the tubular connecting member permits a variety of different securing bead arrangements to be utilized, either with or without the terminal flange at the first end.

In accordance with the method of the present invention, an adhesive seal is provided between the main air handling system and the connecting member by providing the collar with a sealing layer along a surface thereof having an outer adhesive on the sealing layer. The collar is fitted laterally about the outside of the connecting member, with a portion of the connecting member extending through the collar and protecting the sealing layer and the adhesive surface from elevated temperatures of air passing through the connecting member. The connecting member is thereafter coupled to the main air handling system by adhering the adhesive surface about the opening in the main air handling system. Because of the independence of the collar about the periphery of the tubular connecting member and by selecting a thin gauge metal which is deformable in a direction toward the surface of the main air handling system, then the collar assists in achieving a conforming contact between the associated gasket and the exterior surface of the main air handling system.

THE DRAWINGS

DETAILED DESCRIPTION

The apparatus and method of the present invention will now be described with reference to the drawings.

Figure 1:
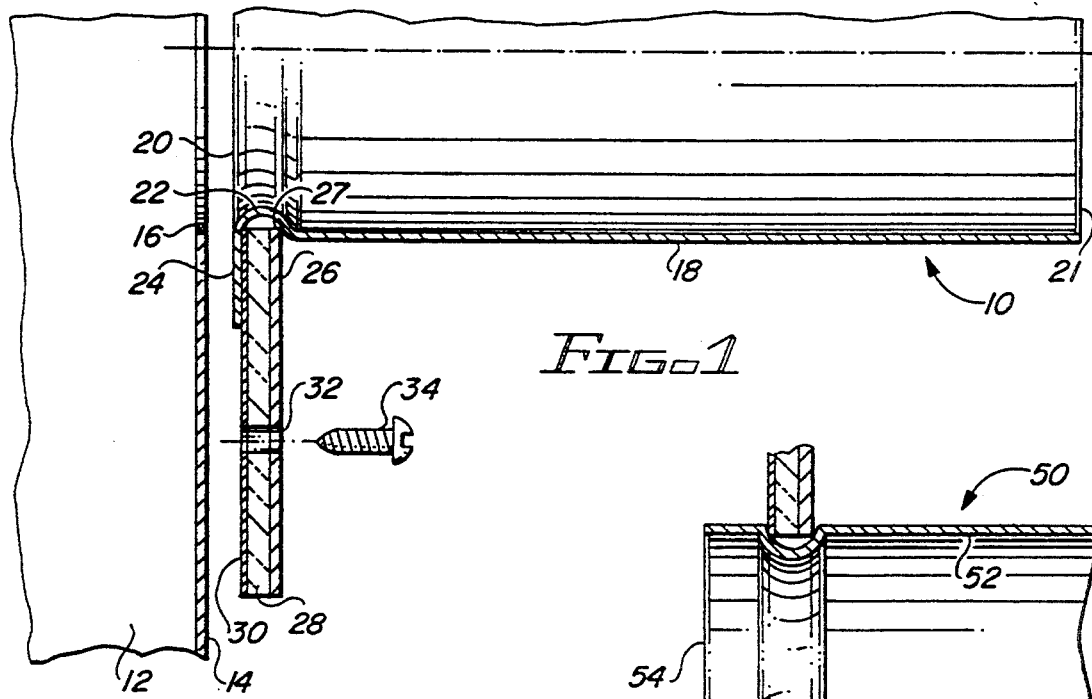
FIG. 1 is a broken away side elevation, in cross section, illustrating one embodiment of the tubular connecting member of the present invention, and the method by which that connecting member is joined with a main air handling system.

Noting FIG. 1, a tubular connecting member in accordance with the present invention is referred to generally by the reference numeral 10 and is adapted to be interconnected with a main air handling system 12 having a wall 14 with an opening 16 therein. The connecting member 10 is formed of a thin gauge metal tube 18 having a first end 20 communicating with the opening 16 in the main air handling system 12, and a second end 21. A bead 22 is formed along the wall 18 adjacent to the first end 20, and extends outwardly to a peripheral flange 24. As thus configured, the bead 22 forms an indentation along the outside periphery of the wall 18 which is dimensioned to receive a thin gauged metal collar 26 having an inside circular opening 27, the diameter of which is slightly less than the outside diameter of the periphery of the tubular wall 18, so that the collar 26 rests in, and is secured by the bead 22.

The collar 26 has a gasket of an insulating material 28 along an outer face thereof, with an adhesive surface on the outside face of the gasket 28, and with a conventional release paper 30 positioned across the adhesive layer. As thus configured and as is shown in FIG. 1, the gasket extends between the inside surface of the flange 24 and a portion of the outside surface of the collar 26. The collar and gasket 26, 28 have plural, spaced holes 32 adapted to receive sheet metal screws 34 which extend through the collar and gasket and then into the wall 14 of the main air handling system.

It will be appreciated by those skilled in the art that the portion of the wall 18 extending through the circular portion of the gasket 28 protects the gasket from elevated temperatures of the air passing through the connecting member against both fire risk and deterioration.

Figure 2:
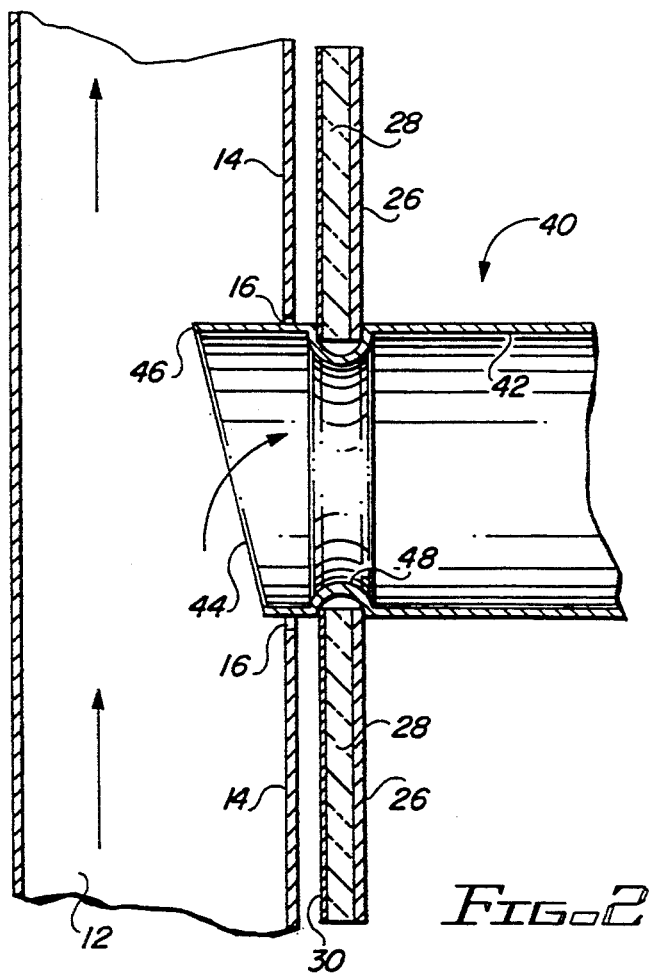

A second embodiment of the present invention is shown in FIG. 2, where like reference numerals are used to identify the same elements as is used in FIG. 1.

In FIG. 2, the connecting member 40 comprises a tubular wall 42 having a first end 44 and a bead 48 similar to the bead 22 of FIG. 1, and which is dimensioned to receive the collar 26 and gasket 28 therein. However, unlike the connecting member 10 shown in FIG. 1, the connecting member 40 of FIG. 2 does not include an outward flange 24, but instead utilizes an extension of the first end 44 of the connecting member 40 to extend that first end into the interior of the main air handling system 12. Further in accordance with the present invention, the first end 44 of the connecting member 40 is beveled outwardly in a downstream direction with respect to air passing through the main air handling system (as shown by the arrows in FIG. 2).

Figure 3:
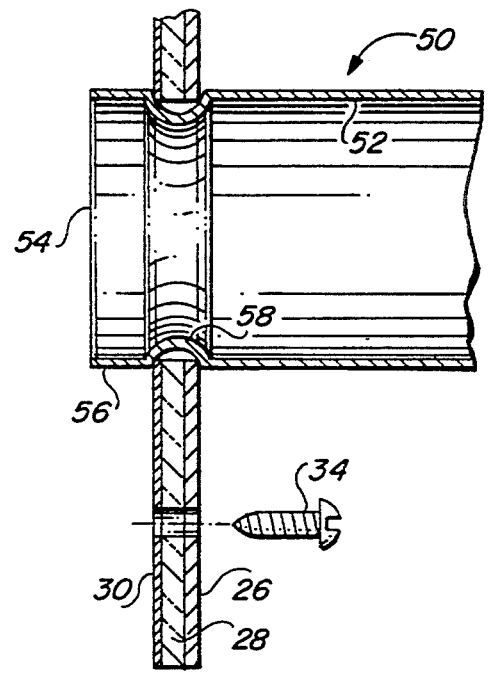
FIGS. 2–5 illustrate other arrangements of tubular connecting members useful in connecting an air handling subsystem with a main air handling system in accordance with the present invention.

The arrangement of the connecting member 50 of FIG. 3 is similar to that of FIG. 2, except that the tubular wall 52 at its first end does not include a downstream bevel, but does include a portion 56 of the first end 54 which extends beyond the bead 58 and into the interior of the main air handling system.

Figure 4:
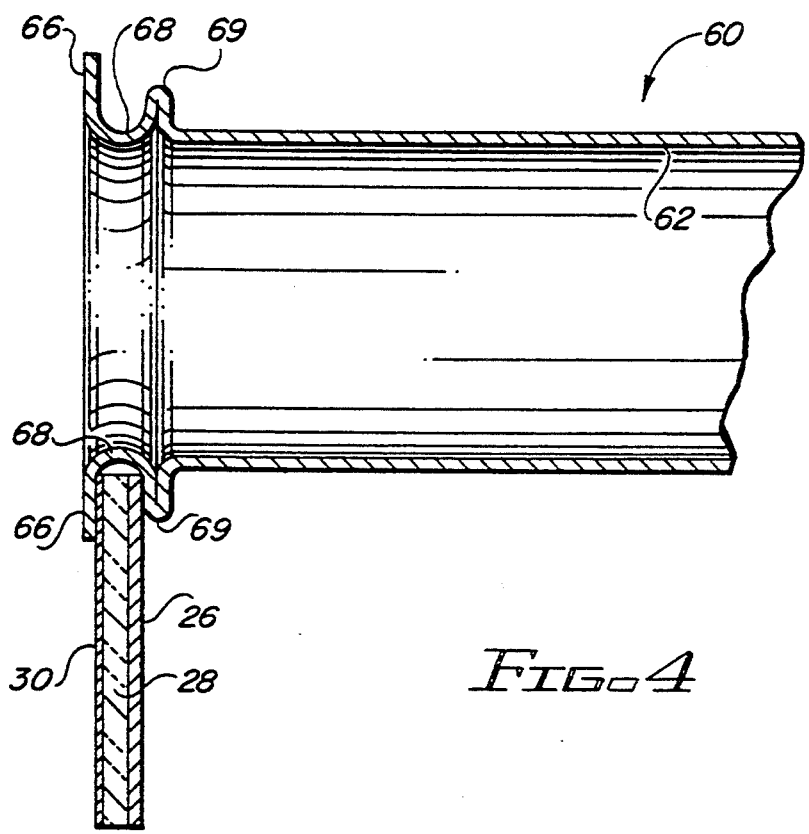

The arrangement of a connecting member 60 shown in FIG. 4 includes a tubular wall 62 having a bead 68 formed of an outward flange 66 at the first end 64, and an outward crimp 69 spaced from the flange 66 a dimension which permits the collar 26 and gasket 28 to be positioned between the flange 66 and crimp 69, thus forming a bead 68.

Figure 5:
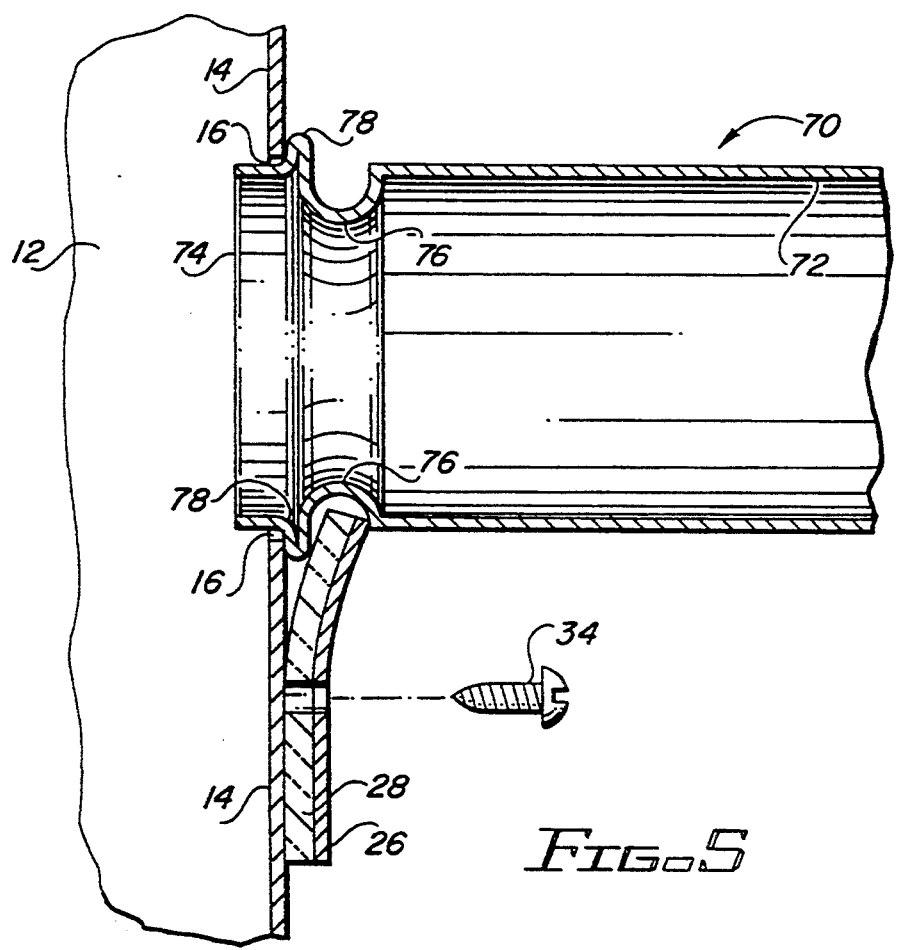

Reference is now made to FIG. 5, which illustrates a connecting member 70 formed of a tubular wall 72 having a first end 74, and a bead 76 and forward crimp 78 defining an area for containment of the independent collar 26 and the gasket 28. FIG. 5 also illustrates that the collar 24 is sufficiently thin so as to be deformable against the outside wall 14 of the main air handling system 12. Further, the independence of the collar 26 about its inner periphery within the bead 76 permits the easy rotation of the inside edge of the collar, further facilitating the conforming of the collar and gasket 26, 28 to the wall 14 of the main air handling system 12.

The apparatus thus described in FIGS. 1–5 facilitates a method for providing an adhesive seal between the main air handling system and a subsystem through the connecting member, while protecting the adhesive seal from damage or destruction caused by elevated temperatures of the air passing through the connecting member.

This concludes the description of the preferred embodiments. A reading by those skilled in the art will bring to mind various changes without departing from the spirit and scope of the invention. It is intended, however, that the invention only be limited by the following appended claims.

What is claimed is:

1. Apparatus for connecting a main air handling system with a subsystem, comprising:
    a connecting member having an elongated passageway defined by a tubular wall extending from a first end to a second end, with the first end adapted to mate with the main air handling system;
    an independent collar having a central opening, the central opening having a dimension corresponding to an outside dimension of the tubular wall at the first end;
    means for securing the collar laterally about the tubular wall adjacent the first end, and with a portion of the tubular wall extending through the collar to the first end;
    a gasket having an outer adhesive surface fixed to an outside surface of the collar which faces toward the first end of the tubular wall, with the portion of the tubular wall extending through and protecting the gasket from an air stream passing through the connecting member and wherein the tubular wall further comprises a lateral flange at the first end, the flange at the first end extending outwardly to a dimension which is substantially less than the lateral dimension of the collar.

2. The apparatus recited in claim 1 wherein the collar securing means comprises an inwardly-indented bead along the tubular wall at the flange, the bead defining an inner diameter of the tubular member at the first end.

3. The apparatus recited in claim 2 wherein the flange has an outer end surface which lies in a common plane with the adhesive surface of the gasket.

4. The apparatus recited in claim 3 wherein a portion of the gasket is sandwiched between an inside surface of the first end flange and the outside surface of the collar.

5. The apparatus recited in claim 4 further comprising a protective layer over the adhesive surface.

6. The apparatus recited in claim 5 wherein the protective layer extends behind the flange.

7. The apparatus recited in claim 6 further comprising plural fastener holes spaced about and extending through the collar, the gasket and the protective layer, all of the fastener holes lying well outside of the periphery of the end flange.

8. The apparatus recited in claim 7 wherein the connecting member and the collar are fabricated of sheet metal.

9. The apparatus recited in claim 8 wherein the collar is sufficiently thin so as to be deformable against an outside wall of a main air handling system.

10. A method for providing an adhesive seal between a main air handling system and a connecting member, and for further protecting the adhesive seal from damage or destruction caused by elevated temperatures of air passing through the connecting member, the method comprising the steps of:

providing a collar having a sealing layer along a surface thereof with an outer adhesive surface on the sealing layer;

providing a connecting member having a first end dimensioned to mate with an opening in the main air handling system;

fitting the collar laterally about the outside of the connecting member at the first end, with a portion of the connecting member extending through the collar and protecting the sealing layer and the adhesive surface from elevated temperatures of air passing through the connecting member;

securing the collar along the connecting member adjacent the first end, forming a bead in the outer wall of the connecting member, and forming an outward flange in the connecting member at the first end, the flange extending laterally outwardly to a dimension substantially less than the outward lateral dimension of the collar; and thereafter coupling the connecting member to the main air handling system by adhering the adhesive surface of the collar about the opening in the main air handling system.

11. The method recited in claim 10 further comprising the step of forming the flange in a common plane with the adhesive surface.

12. The method recited in claim 10 further comprising the step of deforming the collar against an outside wall of the main air handling system.

13. The method recited in claim 10 further comprising the step of extending the first end of the connecting member into the interior of the main air handling system.

14. The method recited in claim 13 further comprising the step of beveling the first end of the connecting member in a downstream direction within the main air handling system.

* * * * *